United States Patent [19]

Lancaster et al.

[11] Patent Number: 4,965,314

[45] Date of Patent: Oct. 23, 1990

[54] OXYGEN BARRIER RESINS

[75] Inventors: Gerald M. Lancaster, Freeport; Tu-Anh Pham; James A. Allen, both of Lake Jackson, all of Tex.

[73] Assignee: The Dow Chemical Company, Midland, Mich.

[21] Appl. No.: 472,679

[22] Filed: Jan. 29, 1990

Related U.S. Application Data

[63] Continuation of Ser. No. 884,129, Jul. 10, 1986, Pat. No. 4,910,253.

[51] Int. Cl.$^5$ .................................... C08F 16/06
[52] U.S. Cl. ................................ 525/60; 525/56; 525/57; 428/36.6
[58] Field of Search ............ 525/56, 57, 60, 185; 528/392

[56] References Cited

U.S. PATENT DOCUMENTS

| | | | |
|---|---|---|---|
| 3,780,140 | 12/1973 | Hammer | 525/185 |
| 4,137,382 | 1/1979 | Vetter, Jr. | 525/185 |
| 4,293,473 | 10/1981 | Eastman | 525/60 |
| 4,866,122 | 9/1989 | Gerlowski et al. | 525/56 |

*Primary Examiner*—John C. Bleutge
*Assistant Examiner*—David W. Woodward

[57] ABSTRACT

Carbon monoxide-containing ethylene polymers are blended with vinyl alcohol polymers, including vinyl alcohol homopolymers and copolymers, to prepare oxygen barrier resins having good processability.

1 Claim, No Drawings

OXYGEN BARRIER RESINS

CROSS-REFERENCE TO RELATED APPLICATIONS

This application is related to co-pending applications Ser. No. 531,110 filed Sept. 12, 1983 and Ser. No. 645,990 filed Aug. 31, 1984, said applications being incorporated herein by reference.

FIELD OF THE INVENTION

Carbon monoxide-containing ethylene polymers are blended with vinyl alcohol polymers, including vinyl alcohol homopolymers and copolymers, to prepare oxygen barrier resins having good processability.

BACKGROUND OF THE INVENTION

The applications cross-referenced above disclose, inter alia, the making of carbon monoxide-containing ethylene interpolymers, and their use as HF-heatable polymers. As disclosed there, these CO-containing polymers can be blended with other polymers to impart HF-heatability to the whole. The interpolymers can be ethylene/carbon monoxide or ethylene/other monomer/carbon monoxide (e.g. E/AA/CO and the like) containing up to about 40, preferably about 5 to about 30, weight percent CO. The polymers are preferably prepared by interpolymerizing a mixture of the monomers in a stirred autoclave at elevated temperature and pressure, using a free radical initiator, thereby producing random interpolymers (often called "random copolymers" even when more than 2 monomers are used).

U.S. Pat. No. 2,495,292 discloses the preparation of an E/CO copolymer containing 40 mol % of CO and also the hydrogenation of the CO groups to COH groups.

The following listed patents are believed to be representative of the art pertaining to interpolymers of carbon monoxide and monoolefins: U.S. Pat. Nos. 2,495,286; 2,497,323; 2,641,590; 3,083,184; 3,248,359; 3,530,109; 3,676,401; 3,689,460; 3,694,412; 3,780,140; 3,835,123; 3,929,727; 3,948,832; 3,948,873; 3,948,850; 3,968,082; 3,984,388; 4,024,104; 4,024,325; 4,024,326; 4,139,522; 4,143,096; and 4,304,887.

U.S. Pat. Nos 4,137,382 and 4,172,939 disclose ethylene/vinyl acetate/carbon monoxide terpolymers.

It is well-known in the relevant art that polyvinyl alcohol (PVOH) is prepared by hydrolyzing polyvinyl esters, usually polyvinyl acetate (PVA), and that ethylene/vinyl alcohol (EVOH) copolymers are prepared by hydrolyzing copolymers of ethylene/vinyl esters, usually ethylene/vinyl acetate (EVA) copolymers. Some references disclose that complete hydrolysis of all the vinyl acetate (or ester) groups is quite difficult, thus one may find a small residual or trace amount of acetate (or ester) groups remaining along the polymer chain, even in commercially available vinyl alcohol polymers.

It is also disclosed in the art that polyvinyl alcohol and ethylene/vinyl alcohol copolymers (both being referred to in places herein as "VOH-containing polymers" or as "vinyl alcohol polymers") are highly resistant to oxygen transport, thus are good barriers for oxygen. Generally the oxygen barrier properties are considerably reduced in inverse proportion to increasing humidity, but are increased in direct proportion to the amount of vinyl alcohol groups in the polymer chain or in indirect proportion to the amount of ethylene groups present.

It has now been found that a blend comprising a vinyl alcohol polymer and a carbon monoxide-containing ethylene copolymer has very good oxygen barrier properties at low humidity and which retains a surprising and beneficial amount of the good oxygen barrier properties in high humidity. We have also found that the processability of the vinyl alcohol polymer is substantially improved by the addition of the CO-containing ethylene polymer. Furthermore the HF-heatability of the blend is a beneficial feature.

SUMMARY OF THE INVENTION

A uniform, normally solid, thermoplastic blend comprising normally solid, thermoplastic, vinyl alcohol polymer(s) and normally solid, thermoplastic, carbon monoxide-containing ethylene interpolymer(s) is prepared by intimately mixing melts of the polymers. The blend is HF-heatable and exhibits good oxygen barrier properties, even in high humidity. The processability of the blended vinyl alcohol polymer is beneficially improved over that of the unblended vinyl alcohol polymer. Alternately, one may use a terpolymer of ethylene/vinyl alcohol/carbon monoxide which is prepared by hydrolyzing the alkylate groups of an ethylene/vinyl alkylate/carbon monoxide terpolymer using a process which does not hydrolyze the CO groups.

DETAILED DESCRIPTION INCLUDING BEST MODE

It can be stated as general propositions that: for a given unblended VOH-containing polymer, an increase in relative humidity is accompanied by increased $O_2TR$ (oxygen transmission rate); at a given relative humidity, an increase in the VOH content of the unblended polymer is accompanied by a decreased $O_2TR$; and an increase in the VOH content of the unblended polymer is accompanied by a decrease in the processability of the polymer.

The vinyl alcohol polymers include polyvinyl alcohol (PVOH) and ethylene/vinyl alcohol (EVOH) copolymers, or blends thereof, which are normally solid at ambient temperatures and which are thermoplastic. The expression "VOH-containing polymers" as used herein includes PVOH and EVOH copolymers as well as blends thereof. The PVOH is considered as being essentially composed of 100% by weight (or by mol) of VOH groups —$CH_2$—CHOH— whereas the EVOH copolymers generally comprise about 1 to about 75 mol % or more (about 1.56 to about 78.6 wt. % or more) of VOH groups. A VOH-containing polymer having between 2% and 99 mol % of VOH groups can be obtained by blending calculated amounts of PVOH and EVOH copolymer. Furthermore, a blend of one embodiment of a VOH-containing polymer can be blended with an embodiment of a CO-containing ethylene interpolymer and a different embodiment of a VOH-containing polymer can be blended with the same (or different) embodiment of a CO-containing ethylene interpolymer, and the 2 blends then blended to form a final blend having a calculated amount of the CO groups and the VOH groups. PVOH is difficult to melt-process because its melting point and its decomposition point are close together; thus, a plasticizer such as glycerine is usually added to reduce its processability temperature.

Some commercially sold EVOH polymers, having a high VOH content are as follows:

EVAL E polymer (sold by Kuraray of Japan) has a nominal VOH content of 56 mol %, and ethylene content of 44 mol %, a nominal density of about 1.14 gm/cc, a melt index of about 5.8 gms/10 minutes, and m.p. of about 180° C.;

EVAL F polymer (sold by Kuraray of Japan) has a nominal VOH content of 68 mol %, an ethylene content of 32 mol %, a nominal density of about 1.19 gms/cc, a melt index of about 1.5 gms/10 minutes, and m.p. of about 181° C.; and SOARNOL D polymers (sold by Nippon Gohsei of Japan) have a nominal VOH content of about 71 mol %, an ethylene content of 29 mol %, a nominal density of 1.21 gms/cc, a melt index of about 3.0 gms./10 minutes, and m.p. of about 182° C.

The CO-containing ethylene interpolymers comprise E/CO copolymers or E/CO/X terpolymers, where X represents a polymerizable unsaturated organic compound, including but not limited to a compound having alkenyl unsaturation or vinyl unsaturation, such as acrylic acid and its alkyl esters, methacrylic acid and its alkyl esters, crotonic acid and its alkyl esters, vinyl alkylates (where alkyl group is usually of 1 to 10 carbon atoms), or vinyl or vinylidene halides. Of the above X compounds, the preferred include acrylic acid, methacrylic acid, and vinyl acetate.

As to the E/CO copolymers, the randomly positioned —CO— groups have the same mol. wt. as the recurring —$CH_2$—$CH_2$— groups, viz 28, thus the mol % CO in the copolymer is the same as its wt %. In the E/CO/X terpolymers, the X groups will have a higher mol wt. and the mol % of each monomer in the polymer will not equal its wt %. Thus, a terpolymer containing, e.g., 50 wt % CO, 30 wt % AA, and 20 wt % ethylene will contain about 33.74 mol % CO, about 52.78 mol % AA, and about 13.49 mol % ethylene.

In general, the amounts of CO-containing polymer to be blended with the VOH-containing polymer depends on the amount of CO groups in the CO-containing polymer and the amount of VOH groups in the VOH-containing polymer. In order to obtain at least some improvement in the processability, while retaining an effectively good $O_2TR$ at high humidity of the VOH-containing polymer, one should add enough of the CO-containing ethylene polymer to provide at least about 1 wt %, preferably 5-50 wt %, of CO groups in the total blend.

The "processability" of a thermoplastic polymer becomes evident in making extrusion cast films and blown films. The blending of CO-containing ethylene polymers into VOH-containing polymers improves the film-casting of the VOH-containing polymer and is evident in the lowered temperature and lowered drive torque in the film-casting operation, including thin cast films of a nominal thickness of, e.g., about 0.8 to about 4 mils (1 mil=0.0254 mm). Unblended PVOH and unblended EVOH (having a high VOH content) are not suitable for making blown films, but when blended with a CO-containing ethylene polymer is suitable for making blown films (a.k.a. the inflated bubble technique). A blend of VOH-containing polymer and CO-containing ethylene polymer has a higher melt strength than the VOH-containing polymer alone, thus improving its film-making ability.

EXAMPLE 1

Improved melt strength

A ZSK-30 Werner-Pfleiderer twin-screw extruder was used to blend 90 and 70 parts by weight of an ethylene/vinyl alcohol copolymer containing 32 mol percent ethylene and 68 mol percent vinyl alcohol (I) was 10 and 30 parts, respectively, of an ethylene/carbon monoxide copolymer containing 15 weight percent carbon monoxide and 85 weight percent ethylene (II). Film of I, II, and their blends was blown utilizing a ¾-inch Killian blown film line. (I) was found to have extremely poor melt strength and could not be blown into film. The 90:10 I/II blend was still difficult to process, but blown film samples could be produced from the 70:30 I/II blend using the same conditions. Table 1 summarizes the results.

TABLE 1

| Blend | | Mol % of Groups (approx.)* | | | Ability to Blow Film |
|---|---|---|---|---|---|
| EVOH wt % | ECO wt % | VOH | CO | Ethylene | |
| 100 | 0 | 68 | 0 | 32 | no |
| 90 | 10 | 61.2 | 1.5 | 37.3 | poor |
| 70 | 30 | 47.6 | 4.5 | 47.9 | good |
| 0 | 100 | 0 | 15 | 85 | good |

*Mathematical approximation, disregarding difference in densities of EVOH and ECO.

EXAMPLE 2

Moisture vs. $O_2TR$

A blend of 70 parts by weight of an ethylene/vinyl alcohol copolymer containing 32 mol percent ethylene and 68 mol percent vinyl alcohol with 30 parts by weight of an ethylene/carbon monoxide copolymer containing 15 weight percent carbon monoxide was fabricated as described in example 1. Pure EVOH, pure ECO resins, and their blend were converted into films utilizing a 1.5 inch MPM cast film line (L/D=24). The oxygen transmission rates of the fabricated films were measured utilizing a MoCon Oxtran-Twin analyzer, results of which are indicated in Table 2.

TABLE 2

| Effects of Moisture on $O_2TR$ (cc. mil/100 sqi. day. atm at 23° C.) | | | |
|---|---|---|---|
| EVOH | EVOH + wt % ECO | ECO | % Relative Humidity |
| 0.0095 | 0.0168 | 245 | 0 |
| 0.040 | 0.035 | N.T.* | 50-75 |
| 13.78 | 2.26 | 250 | 100** |

*N.T. means "not tested"
**The film samples were soaked in distilled water for 15 minutes at room temperature and wiped dry with clean tissue before testing. The test gases were saturated by bubbling through water and a layer of moist tissue was also placed on top of the film samples during testing to prevent them from being dried out. The humidity level in the test chamber was monitored using a Model HS-1CHDT-2A relative humidity tester from Thunder Scientific.

It can be seen from the results that while EVOH was extremely moisture sensitive at high humidity levels, the addition of 30 weight percent of an ECO copolymer significantly improved the oxygen barrier properties of the material in high humidity environments.

EXAMPLE 3

$O_2TR$ vs. ethylene content

The following blends were made as described in example 1: Blends of 90 and 70 parts by weight of an EVOH copolymer containing 32 mol percent ethylene and 68 mol percent vinyl alcohol (I) with 10 and 30 parts by weight, respectively, of an ECO copolymer containing 15 weight percent CO comonomer (II); blends of 90 and 70 parts by weight of I with 10 and 30 parts by weight, respectively of an ECO copolymer containing 18 weight percent CO (III). Table 3 shows the oxygen barrier properties of these blends, along with those of I and another pure EVOH copolymer containing 44 mol percent ethylene and 56 mol percent vinyl alcohol (IV). All testing was performed on cast film samples fabricated as described in example 2.

It is known in the art that the oxygen barrier properties of EVOH copolymers decrease as the ethylene contents of the resins increase. It can be seen from Table 3 that though the ethylene contents of the blends were nearly the same as or higher than the ethylene content of IV, their oxygen barrier properties remain as good as or better than the oxygen barrier property of IV.

TABLE 3

| Effects of ethylene content on oxygen transmission rates | | |
| --- | --- | --- |
| Polymer blend | Mol % ethylene | $O_2TR$ |
| I | 32 | 0.0095 |
| IV | 44 | 0.09 |
| I + 10 wt % II | 39 | 0.0120 |
| I + 30 wt % II | 51.66 | 0.0168 |
| I + 10 wt % III | 38.68 | 0.0133 |
| I + 30 wt % III | 50.65 | 0.0786 |

EXAMPLE 4

Impact strength vs. ECO present

The following blends were made in the same manners as described in example 1: 90, 70, and 30 parts by weight of an EVOH containing 29 mol percent ethylene and 71 mol percent vinyl alcohol (V) with 10, 30, and 70, respectively, parts by weight of an ECO containing 10 weight percent of carbon monoxide (VI). The Izod impact of V, VI, and their blends were tested according to ASTM D-256-56 at room temperature. The Izod impact (in ft.lbs/in) is a means of determining the impact resistance or the ability to withstand impact of a material. While pure EVOH is extremely brittle, the addition of ECO improved its ability to withstand impact, a desirable property in most packaging applications. Table 4 summarizes the results.

TABLE 4

| Impact resistance of EVOH/ECO blends | |
| --- | --- |
| Polymer blend (EVOH/ECO) | Izod Impact (f.t.lbs/in) |
| 100/0 | 0.44 |
| 90/10 | 0.63 |
| 70/30 | 1.05 |
| 30/70 | 1.90 |
| 0/100 | 6.99 |

We claim:

1. A mono- or multi-layered packaging film, sheet, injection-molded article or blow-molded article characterized by its HF-heatability and its low oxygen transmission rate, wherein said packaging film, sheet, injection-molded article or blow-molded article consists of a uniform blend of an ethylene/carbon monoxide copolymer and an ethylene/vinyl alcohol copolymer, wherein the carbon monoxide groups comprise more than about 1.5%, but less than about 15 mol% of the blend, the vinyl alcohol groups comprise more than 0 mol %, but not more than about 61 mol % of the blend, and the ethylene groups comprise the remainder of the blend.

* * * * *